Aug. 29, 1967  D. M. SOWARDS  3,338,995
PROCESS OF FABRICATING SHAPED REFRACTORY STRUCTURES
Filed Jan. 10, 1964

INVENTOR
DONALD MAURICE SOWARDS

BY
ATTORNEY

United States Patent Office 3,338,995
Patented Aug. 29, 1967

3,338,995
PROCESS OF FABRICATING SHAPED
REFRACTORY STRUCTURES
Donald Maurice Sowards, Claymont, Del., assignor to
E. I. du Pont de Nemours and Company, a corporation
of Delaware
Filed Jan. 10, 1964, Ser. No. 336,983
1 Claim. (Cl. 264—44)

ABSTRACT OF THE DISCLOSURE

Thin-walled refractory structures having high flexural strength are made by applying thin layers of a refractory slurry to fugitive material, allowing the slurry to dry, and subsequently firing the dried structure in an oxygen atmosphere. The slurry contains aluminum particles, a refractory material, a catalyst and a binding agent.

Figure 1:
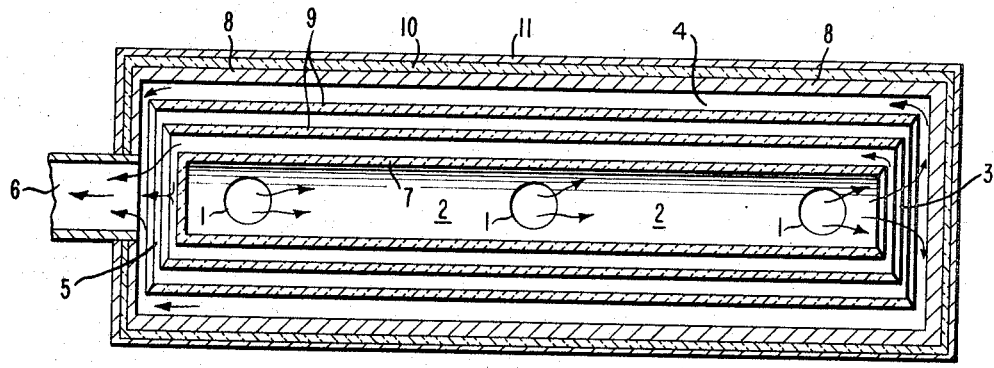

This invention is directed to significantly improved and novel refractory structures composed of thin-walled sections and a unique process for preparing said structures, said process or method being of patentable merit.

The conventional ceramic techniques, such as slip-casting, pressing, extrusion, dry pressing and soft plastic forming are not satisfactory for the preparation of complex structures having thin-walled sections such as honeycomb elements and the like.

It has been proposed (e.g., U.S.P. 2,977,265) to coat a core structure of sheet material with a conventional ceramic powder and fire the composite structure. This method does afford an acceptable control of the dimensions of the structure when relatively low melting ceramic frits are used which bond at 800–1000° C.; however, the resulting products are of little use at elevated temperatures.

It has also been proposed (British Patent 882,484) to make ceramic honeycomb structures by coating a paper with a sinterable ceramic material and an organic binder, corrugating the coated paper, forming the corrugated paper into the desired structure and firing. The use of a low melting ceramic (e.g., glass) affords a product which is inherently restricted to relatively low temperature use. If a high melting ceramic is used and is bonded by self-sintering, the high shrinkage involved prevents close control of the dimensions and shape of the fire product.

It is, therefore, an object of the present invention to provide novel refractory structures which are complex composed of thin-walled sections for use at high temperatures. Another object of this invention is to provide a novel process for making said structures, said process achieving good control of the final dimensions.

These and other objects of the invention will become apparent from the following description and claims.

More specifically, the process embodiment of this invention is directed to a process of fabricating shaped structures having thin sections of refractory materials as the structural elements, said process comprising the steps:

(I) Providing elements of a shaped structure formed from thin sheets of a fugitive material,
(II) Coating the elements of the shaped structure
    (A) to a thickness of less than about 0.19" (4.8 mm.) and preferably no more than about 0.125" (2.94 mm.) on either side of the material,
    (B) with a composition consisting essentially of
        (1) aluminum particles
            (a) passing a 45-mesh sieve (preferably 140/270),
            (b) in an amount of from 15 to 95%,
        (2) refractory material
            (a) passing a 20-mesh sieve (3) a catalyst
            (a) in an amount of at least 0.5% of the weight of aluminum
        (4) a binding agent in an amount sufficient to provide an adherent coating in the unfired state,
(C) by means of a dispersion of the above composition,
(D) drying the coated structure,
(E) firing in an oxygen-containing atmosphere until the aluminum is oxidized to at least 60% of theoretical.

In another embodiment of the invention process, the coated elements may be combined into more complex structures, and recoated as desired before drying and firing. Also, this novel process may be practiced by mixing the aluminum particles and refractory material with a particulate or fibrous fugitive material and then forming sheets. The resulting sheets are then fabricated to the desired shape, impregnated with catalyst and fired. The catalyst can be also incorporated into the sheet during its formation. The sheets should contain at least about 25% refractory-forming materials (aluminum and refractory materials) and preferably at least 50% of such materials. The relative proportions of aluminum, refractory material and catalyst should be within the heretofore described limits.

This invention is also directed, more specifically, to
(I) a refractory structure
    (A) composed of thin-walled sections
        (1) having a thickness of less than about 0.19 inch (4.8 mm.) and preferably less than about 0.125 inch (2.94 mm.),
        (2) consisting essentially of a crystalline refractory material, containing by analysis at least 25% alumina derived from the in situ oxidation of aluminum,
        (3) having a porosity of between about 20 and 70%, said porosity being substantially uniformly distributed,
    (B) characterized by a flexural strength at 1550° C. of at least 130 pounds per square inch (9.3 kg./cm.²).

The thin sheets of a fugitive material serve as the temporary core for the final refractory structure. The material should be combustible or vaporizable at the temperatures encountered in firing. Organic substances (e.g. cellulose or synthetic polymers) are generally satisfactory. The sheets may also be formed of a material which is incorporated into the fired structure by solution or by reaction such as a relatively low melting ceramic material.

The sheets can be in the form of paper, cardboard, woven fabrics, or non-woven fabrics, made from fibrous materials such as cellulose, polyethylene, polypropylene, poly(ethylene terephthalate), various nylons, glass fibers, and ceramic fibers. Films of the aforementioned materials may also be used. The sheets should be sufficiently thick and strong to be self-supporting but in general should not be more than about 2 mm. thick. Preferably, the sheet material is porous.

Papers and fabrics of cellulosic materials are especially useful and are readily formed into the desired shapes by molding and gluing of units.

COATING COMPOSITIONS

Aluminum particles of alloys in which aluminum constitutes the major component may be used in practicing this invention. The metal used is preferably clean and free from grease and oil. The particles of said metal should all pass a 45-mesh sieve and preferably pass a 140-mesh sieve.

The refractory material utilized should have a softening point above about 1000° C. or be converted to such a high melting substance during the firing. Thus, hydrated aluminas, corundum, magnesia, magnesite, dolomite, zircon, clay, burnt clay grogs, abestos, silicon carbide, forsterite and the like may be used. The refractory material should pass a 20-mesh sieve and may be much finer.

A catalyst for the herin described reaction must be present in an amount of at least 0.5% of the weight of the aluminum. The catalyst is selected from the class consisting of oxides of alkali metals, hydroxides of alkali metals, oxides of barium, oxides of vanadium, and substances which yield the oxides upon firing.

A catalyst for the herein described reaction must be present in order for the aluminum to wet and spread to all particles in the mixture and oxidize to form a strong alumina matrix. An amount of catalyst equal to about 0.5 to 15% of the weight of the aluminum should be present to insure a useful commercial rate of reaction. The amount of catalyst is preferably between about 2 and 10% of the weight of the aluminum. If aluminum particles are heated in air in the absence of any catalyst only 8% oxidation is observed after 15 hours at 1150° C. In addition, the alumina produced is not alpha alumina and is not well bonded. Even 16 hours firing at 1300° C. affords only 12% oxidation.

Such catalyst-yielding substances include the acetates, benzoates, bismuth thioglycolates, bisulfites, bisulfates, bromates, nitrates, nitrites, citrates, dithionates, ethylates, formaldehyde sulfoxylates, formates, hydrosulfites, hypochlorites, metabisulfite, methylates, oleates, oxalates, perchlorates, periodates, persulfates, salicylates, selanates, silicates, stearates, sulfates, sulfites, tartrates and thiosulfates of the herein recited metals. Sodium vanadate is particularly useful.

The catalyst is calculated on the bases of the metal oxide that it forms in those cases where a substance yielding a catalyst under the conditions of the process is used.

The catalyst may be added as a separate ingredient such as sodium silicate or it may be present as an impurity in one of the other components of the coating. Certain clays may contain sufficient impurities to serve as a catalyst.

A binding agent is used to provide sufficient strength to the coated structure prior to firing. Substances such as sodium silicate, clay, sodium alginate, sodium carboxy methyl cellulose and the like are suitable. These can also serve as the source of the catalyst and as a thickening agent to control the viscosity of the coating composition.

The amount of binding agent is not critical and can vary between about 0.5 and 2% of the total weight of the dry coating composition. In those cases where a catalyst or a substance yielding a catalyst (e.g., sodium silicate, or sodium alginate) or a refractory material (e.g., clay) can also serve as a binding agent, the amount may be larger.

The components of the coating compositions are most conveniently applied as an aqueous dispersion or slurry. For some purposes an organic solvent might be preferred. In this case various organic polymeric substances could be used as binding agents and/or thickening agents.

For example, tar or rubber could be used as a binder when using kerosine or benzene, respectively, as the dispersing medium.

The dispersion of the coating composition may be applied by dipping, brushing, spraying, etc., to one or both sides of the fugitive material.

The coated object is dried following conventional ceramic practices.

The dried coated objects are fired in an oxygen-containing atmosphere at a temperature between about 600° C. and the melting point of the refractory material present until at least about 60% (preferably 90–100%) of the aluminum has been oxidized. The firing rate is not too critical. Preferably, the dried shapes are placed in a relatively cold furnace, heated to 600° C. at a rate of about 25°/hour, held at about 600° C. for 8 hours, heated to higher temperatures at a rate of about 100° C./hour and held at the highest temperature (e.g., 1500° C.) until the desired oxidation of the aluminum and formation of compounds such as spinel or mullite has occurred.

The products produced according to the present invention have significant utility as high temperature insulation panels, heat exchangers, radiant burners, regenerators and catalyst carriers.

All sieve measurements are made with U.S. Sieve Series. The expression "—X mesh" indicates the particles all pass through an X mesh sieve. The expression "X/Y" mesh indicates that all particles pass through an X mesh sieve and are retained on a Y mesh sieve.

Flexural strength is measured according to ASTM Standard 1958, part 4, page 670, Text No. C293–57T with the use of a span width of 2.5 to 10 cm. Results are reported as pounds per square inch (psi) and kilograms per square centimeter (kg./cm.$^2$).

Porosity is calculated by the relation $$\frac{d_t - d_b}{d_t} \times 100$$

where $d_t$ is the true density of the body (based on composition) and $d_b$ is the bulk density (total weight/total volume, including pores). All densities presented in the examples are bulk densities.

Figure 2:
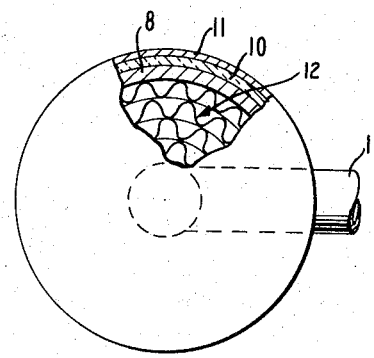

Referring to FIGURE 1, exhaust gas and auxiliary air flow from the exhaust ports 1 of the engine into the reaction chamber 2 and then exit from the reaction chamber at one or more locations 3 to flow through passages 4 and to exit at location 5 into exhaust port 6 of the reactor. The assembly includes an outer wall 7 of the reaction chamber 2, an outer shell 8, and two or more heat-reflecting members 9. The outer shell 8 may be covered with an insulating layer 10 and an outer casing 11. The wall 7, shell 8, and heat-reflecting layers 9 are arranged essentially parallel to each other and are essentially continuous except for the openings required at 1, 3 and 5 for passage of the exhaust gases into and from the central reaction chamber and into the exhaust port. Thus, they form parallel paths for direct passage of the exhaust gases from the reaction chamber 2 directly to the exhaust port 6. FIGURE 2 represents a sectional view of an alternate embodiment of FIGURE 1.

FIGURE 2 is a sectional view of an alternate manifold reactor embodiment of FIGURE 1 wherein the flow of said gases is the same as in FIGURE 1, the essential difference residing in the particular heat-reflecting means utilized, said means being ceramic in nature as hereinafter described in representative Example 1. The corrugated component of the reactor heat-reflecting means is identified by the numeral 12 and the preparation of this reactor is described in detail in the heretofore identified example.

Representative examples further illustrating the present invention follow.

*Example 1*

Corrugated kraft paper having corrugations with a wave length of about 0.34 inch (8.6 mm.) attached to a backing sheet is used as the fugitive sheet material. A piece about 82 inches (208 cm.) long and 8 inches (20.4 cm.) wide with the corrugations transverse to the length is coated on top and bottom with a mixture of equal parts by weight of (1) aluminum powder (—200 mesh, 98% Al), (2) sodium silicate (Na$_2$O:SiO$_2$ of 1:3.25, 40° Bé. ca. 35% solids), (3) 1% aqueous solution of sodium carboxy methyl cellulose, and (4) hydrated alumina (Al$_2$O$_3$·1H$_2$O). The coated paper is rolled into a cylinder with the corrugations on the outside. Commercial paper toweling is dipped into the coating composition and wrapped around the outside of the cylinder. The assembly is tied with string and dried at 80° C. for four hours.

The dried cylinder is placed in a cold furnace, and fired in an air atmosphere, as follows:

to 600° C. in about 6 hours
at 600° C. for 16 hours
at 700° C. for 8 hours
at 950° C. for 12 hours and
at 1500° C. for 16 hours.

The fired unitary structure is a cylinder 8″ (20.4 mm.) high with an outside diameter of 6″ (15.2 cm.) and an inside diameter of 4.7″ (11.9 cm.). The shape of the corrugations is perfectly retained so as to afford a honeycomb section with 3 layers of tubes running the length of the cylinder. The wall sections are about 0.025″ (0.61 mm.) thick. When the coating composition is replaced with one consisting of 80 parts of the hydrated alumina, 20 parts of the sodium silicate and 18.5 parts of 10% aqueous CMC the coating breaks into small pieces during the firing schedule.

A hole 1.75″ x 1.75″ (4.44 x 4.44 cm.) is cut through one side of the cylinder midway of its length. The hole is lined with cheesecloth saturated with the above coating composition. The entire structure is dried and refired. One end of the open center core of the cylinder is plugged with ceramic. The structure is assembled in a cylindrical steel casing 10″ (25.4 cm.) long to provide for the entrance of gases into the core of the cylinder, where they pass to a refractory block and then back through the annular spaces of the cylinder to an exit in the casing. A layer of a commercial fibrous insulation about 0.25″ (0.64 cm.) is packed between the casing and the refractory cylinder.

The entire assembly is bolted onto a 1962 Oldsmobile engine mounted on a test stand and connected to a dynamometer. The entrance port of the assembly is closely connected to the common exhaust port of the center 2 cylinders. Auxiliary air is fed into the exhaust port.

The engine is run for a total of 40 California hot cycles and 11 separate one-hour runs at a speed equivalent to 40 miles per hour (64 kilometers per hour) with a road load. In each cycle the temperature of the refractory cylinder ranges from ambient to 650 to 700° C. The refractory cylinder suffers no significant change to this exposure of thermal shock and vibration except for one piece of the inner lining about 0.5 x 0.25 inch (1.27 x 0.63 cm.) that has chipped off.

*Example 2*

This example shows the surprising and unexpected results of this process.

The following compositions are made:

A:                                  Parts
  Aluminum powder _____ 80
  Sodium silicate _____ 20
B:                                  Parts
  Aluminum powder _____ 50
  Clay _____ 50
  CMC solution _____ 8
C:                                  Parts
  Tabular alumina _____ 80
  Sodium silicate _____ 20

The aluminum powder, sodium silicate and 1% sodium carboxy methyl cellulose (CMC) of Example 1 was used.

The clay is a bonding clay (Cedar Heights Clay Co., Oakhill, Ohio) analyzing: ignition loss 9.4%, $SiO_2$ 57.3%, $Al_2O_3$ 28.5%, alkali metal oxides 1–5%, other impurities ca. 3.7%.

The tabular alumina is a high-fired alumina consisting of coarse, well developed alpha alumina crystals and is −325 mesh.

Bars of 1″ x 1″ x 4″ (2.5 x 2.5 x 10 cm.) are molded with 2500 p.s.i. pressure (176 kg./cm.²) dried at 20° C. and fired as follows:

Degrees C.:                               Hours
  To 600 _____ 8
  At 600 _____ 10
  At 700 _____ 8.5
  To 1500 _____ 7.0
  At 1500 _____ 12.5

(1) The bars of composition "A" have a dense outer skin surrounding a weak friable center so that it is of little value as a refractory bar. When the procedure is repeated the bar breaks into 5 pieces during the firing. The use of a maximum firing temperature of 1000° C. for 8.5 hours gives an apparently stronger bar since only about 43% of the aluminum is oxidized (based on weight gain).

(2) The bars of composition "B" have a good appearance, and a flexural strength of only 1997 p.s.i. (140 kg./cm.²) at 25° C. Cut cross-sections show a dense outer skin and much free aluminum. The weight gain (13 grams per 140 grams dry weight) indicates the oxidation of only about 22% of the aluminum. Analysis of the product by X-ray diffraction shows the presence of the following crystalline compounds in the order of their intensities: alpha alumina, silicon, aluminum nitride, and aluminum.

(3) The bars of composition "C" have a good appearance and a flexural strength of 8140 p.s.i. (572 kg./cm.²) at 25° C.

These unfavorable results with the aluminum powder in Items 1 and 2 would not suggest their use as coating materials.

(4) A mixture like composition "A" plus 22 parts of 1% CMC solution is poured onto a waterproof paper plate to give a flat disc about 0.1″ (c. 5 mm.) thick. This is air dried and fired as follows: room temp. to 200° C. (17 hrs.), 200 to 820° C. (8 hrs.), 820–1260° C. (23 hrs.), 1260–1540° C. (20 hrs.) and at 1540° C. for 9 hrs.

(5) A mixture like composition "B" except containing 68 parts of CMC solution is cast into a thin disc as above, dried and fired with the same schedule as for the bars. The fired disc is smooth and flat with a thickness of 0.1″ (2.5 mm.). The crystalline compounds present in the product (by X-ray) are mullite, and alpha alumina. A study of the cut cross-section reveals a uniform structure, with no skin portion and no visible metal.

(6) A mixture like composition "C" except containing 14 parts of CMC solution is cast into a thin disc as above, dried and fired using the schedule of Item 4. The fired product [0.08″ (2.0 mm.) thick] is warped. Results are given in Table I.

TABLE I

| Item | Flexural strength at 1,550° C. | | Percent linear change during firing |
|---|---|---|---|
| | P.s.i. | Kg./cm.² | |
| 4 | 4,080 | 287 | +2.0 |
| 5 | 1,120 | 79 | +3.3 |
| 6 | 128 | 9.1 | −9.0 |

The superior hot temperature strength and dimensional stability during firing of the examples of this invention (Items 4 and 5) as compared to a control (Item 6) are very surprising in view of the relatively poor performance of the same compositions in massive bar forms.

*Example 3*

A composition of the aluminum powder of Example 1 (1 part), paper lath (wood pulp) (1 part), a finely divided eta alumina (1 part) and water (500 parts) is well mixed in a laboratory blender. The suspension is formed into a sheet by filtering onto a filter paper in a Buchner funnel. The sheet is removed from the filter paper, dried, dipped into a 50% aqueous solution of 40° Bé. sodium silicate, redried and fired up to 1400°

C. The fired sheet, about 0.02" thick (0.5 mm.) is a coherent, self-supporting ceramic.

*Example 4*

This example is intended to set forth representative compositions of the present novel process. The test specimens are cast in thin strips to provide suitable test pieces.

Various compositions are made using aluminum powder, clay, tabular alumina, sodium silicate, 1% aqueous solution of sodium carboxy methyl cellulose and commercial silica flour. All materials except the silica flour are the same as used in Example 2.

The aqueous dispersions are poured into a mold about 10 x 2.5 x 0.25 cm. made of cardboard strips with a sheet of a polyester film as a bottom. The castings are dried at room temperature, removed from the mold and fired as follows: room temperature to 600° C. (24 hours), 600 to 700° (4.5 hours), 700 to 800° (15.5 hours), 800 to 1000° (8.5 hours) and 1000 to 1500° (24 hours).

Results are presented in Table II. All items are strong, have good refractoriness, and a porosity of between 30 and 60%. X-ray analysis of Item *e* shows mullite as the main constituent plus alpha alumina. The values of linear expansions show to one skilled in the art how this can be controlled as desired by varying the composition of the coating.

The coating compositions of Table II are used to coat a paper as in Example 1. The fired refractory pieces are very strong and closely conform to the shape of the fugitive paper shape.

The embodiments of the invention in which an exclusive property or privilege is claimed are as follows:

A process of fabricating shaped refractory structures having a substantially distributed porosity of between about 20 and 70% and being further characterized by having a flexural strength at 1550° C. of at least 130 pounds per square inch, the structural elements of said structures being thin sections of a refractory material, which process comprises the following steps:

(A) coating elements of a shaped structure formed from thin sheets of a fugitive material to a thickness of less than about 0.19 inch with a composition consisting essentially of:
  (1) aluminum particles passing a 45-mesh sieve and in an amount of from 15 to 95% by weight,
  (2) from about 85 to about 5% by weight of a refractory material passing a 20-mesh sieve,
  (3) a catalyst in an amount equal to at least 0.5% of the weight of said aluminum, and
  (4) a binding agent in an amount sufficient to provide an adherent coating on said fugitive material in the unfired state, (B) followed by drying the resulting coated structure and then (C) firing said coated structure in an oxygen-containing atmosphere until said aluminum in the coating is oxidized to at least 60% of theoretical and to remove said fugitive material.

TABLE II

| Item | Coating Composition | | | | Fired Specimens | | | |
|---|---|---|---|---|---|---|---|---|
| | Aluminum | Sodium silicate solution | Refractory material | CMC solution | Density, g./cm.$^3$ | Flexural Strength | | Linear expansion |
| | | | | | | At 20° C. p.s.i. (kg./cm.$^2$) | At 1,550° C. | |
| (a) | 40 | 20 | 40 a | 31 | 1.90 | 1,344 (94) | 413 (29) | 0.5 |
| (b) | 20 | 20 | 60 a | 30 | 2.02 | 11,040 (775) | 251 (18) | −1.0* |
| (c) | 80 | 0 | 20 c | 65 | 1.92 | 3,430 (241) | 750 (53) | 6.1 |
| (d) | 60 | 0 | 40 c | 72 | 1.98 | 2,000 (140) | 182 (13) | 7.5 |
| (e) | 40 | 20 | 40 s | 29 | 2.39 | 4,125 (290) | 612 (43) | 1.5 |
| (f) | 80 | 20 | 0 | 26 | 2.28 | 10,350 (730) | 3,610 (250) | 3.0 | a=tabular alumina.   c=clay.   s=silica flour.   *=shrinkage.

The preceding representative examples may be varied within the scope of the present total specification disclosure, as understood and practiced by one skilled in the art, to achieve essentially the same results.

As many apparently widely different embodiments of this invention may be made without departing from the spirit and scope thereof, it is to be understood that this invention is not limited to the specific embodiments thereof except as defined as follows.

References Cited

UNITED STATES PATENTS 2,599,185   6/1952   Lepp et al. _____ 106—65 X
3,112,184  11/1963   Hollenbach _____ 161—68 X
3,244,539   4/1966   Hare _____ 106—65
3,272,686   9/1966   Smith et al. _____ 156—89 X EARL M. BERGERT, *Primary Examiner.*

H. F. EPSTEIN, *Assistant Examiner.*